United States Patent [19]
Akiyama et al.

[11] Patent Number: 5,493,605
[45] Date of Patent: Feb. 20, 1996

[54] CORDLESS TELEPHONE SYSTEM ADAPTIVE LINKS BETWEEN BASE UNITS AND HANDSET UNITS

[75] Inventors: Masaru Akiyama, Chiba; Junji Kanjo, Sakura, both of Japan

[73] Assignee: Uniden Corporation, Chiba, Japan

[21] Appl. No.: 104,680

[22] Filed: Aug. 10, 1993

[30] Foreign Application Priority Data

Oct. 1, 1992 [JP] Japan .................................... 4-258726

[51] Int. Cl.$^6$ ............................................. H04Q 7/38
[52] U.S. Cl. ................... 379/61; 379/58; 379/60; 455/33.2
[58] Field of Search ........................... 379/58, 60, 61; 455/33.2, 54.1, 56.1

[56] References Cited

U.S. PATENT DOCUMENTS

| | | | |
|---|---|---|---|
| 4,144,412 | 3/1979 | Ito et al. | |
| 4,765,753 | 8/1988 | Schmidt | 379/60 |
| 4,833,702 | 5/1989 | Shitara et al. | |
| 5,067,171 | 11/1991 | Kawano | 379/60 |
| 5,101,501 | 3/1992 | Gilhousen et al. | 379/60 |
| 5,243,641 | 9/1993 | Evans | 379/60 |
| 5,327,574 | 7/1994 | Monma et al. | 455/33.2 |
| 5,396,541 | 3/1995 | Farwell et al. | 379/60 |

FOREIGN PATENT DOCUMENTS

| | | |
|---|---|---|
| 64-77357 | 3/1989 | Japan . |
| WO91/13509 | 9/1991 | WIPO . |

*Primary Examiner*—Dwayne D. Bost
*Attorney, Agent, or Firm*—Ratner & Prestia

[57] ABSTRACT

The present invention eliminates the need for non-audio communications performed between base units and handset units to identify the handset unit existing communication zones, and thereby reduces the consumption of handset unit batteries to extend the lives thereof. The cordless system telephone apparatus in accordance with the invention comprises a control unit connected to a public communication network through telephone lines, a plurality of base units connected to the control unit, and a plurality of handset units communicating with the base units by way of radio waves. In waiting states where the handset units are not in audio communication with the base units, the control unit does not carry out, through the communications with the base units, identifications or registrations of the communication zones in which the handset units exist. The switching of the base units for higher communication qualities is only conducted during audio communications. In those periods, the control unit is, for the switching, provided with outside-zone signals based on the levels of the signals received through respective message channels by the handset units or base units.

10 Claims, 3 Drawing Sheets

CORDLESS TELEPHONE SYSTEM ADAPTIVE LINKS BETWEEN BASE UNITS AND HANDSET UNITS

BACKGROUND OF THE INVENTION

1. Field of the Invention

The present invention relates to a cordless system telephone apparatus, and more particularly, to a telephone apparatus comprising a control unit connected to a public communication network, a plurality of base units connected to the control unit, and a plurality of handset units which respectively establish an audio link with one of the base units.

2. Description of the Prior Art

A cordless system telephone apparatus, wherein base units and handset units establish audio links with each other by selectively employing message channels, are known in the prior art. Such telephone apparatus are configured with a control unit connected to a public communication network, a plurality of base units connected to the control unit, and a plurality of handset units which respectively establish audio link with one of the base units. The control unit controls the setting of message channels between the base units and handset units, the registration of the handset unit locations, and others.

A cordless system telephone apparatus of this type covers a radio communication area which is divided into several zones and one or more base units are assigned to each of the zones for the radio communication services with the handset units in the corresponding zones. Furthermore, the same radio frequency band is allocated to each of the zones to avoid radio interferences among them. Namely, radio waves in the same frequency band are used in the multiple zones. This results in simultaneous communications by a number of handset units using radio waves in a narrow frequency band, realizing the efficient utilization of radio waves.

The radio communications between the base units and handset units are conducted on the basis of multi-channel access system, whereby a plurality of message channels are assigned to each of the zones and each of the handset units in one of the zones communicates with the base unit corresponding to the zone through one of the channels.

In such cordless system telephone apparatus, the handset units which can move freely potentially communicate with those base units covering the zones for other handset units. In this case, however, it is difficult for the handset units to exchange radio wave signals of satisfactory qualities with the base units. This raises a necessity for identifying the zones where the handset units communicating with the base units exist, in order to provide the optimum qualities of radio communications.

The base units and handset units communicate with each other through two message channels of different frequencies. In general, one of the two channels is employed for the communications from the handset units to the base units, being referred to as upward message channel and the other for the communications from the base units to the handset units, being referred to as downward message channel. For instance, the frequencies of the two channels are in the 900 MHz band and the difference of the frequencies is 45 MHz for the cordless system telephone apparatus in European countries. In order to identify and register the zones of the handset units, the base units and the handset units of the prior art cordless system telephone apparatus exchange radio wave signals at intervals of a predetermined time during not only audio communications but also waiting states, monitoring the radio wave receiving conditions in control channels or the like. If the magnitudes of the received signals are less than, for instance, 30 dBμV/m, the base units are searched to find out the one for better receiving conditions by switching the base units. Then the zone corresponding to the found out base unit is re-registered for the handset unit in the zone by the control unit.

In this way, the base units and handset units of the conventional telephone apparatus must communicate with each other even during the waiting states, where no audio communications take place, to identify and register the zones for the respective handset units. Therefore, the power of handset unit batteries is additionally consumed, resulting in the relatively shortened lives of the batteries. Also, a pair of upward and downward message channels are occupied for the waiting states in the prior art, conflicting with the efficient utilization of radio waves.

SUMMARY OF THE INVENTION

It is an object of the present invention to provide a cordless system telephone apparatus wherein its base units and handset units do not conduct radio communications during waiting states for identifying and re-registering the zones in which the handset units exist, reducing the consumed power of the handset unit batteries, as well as realizing the efficient utilization of radio waves by eliminating the need for using channels during the waiting states.

The invention provides a cordless system telephone apparatus comprising a plurality of base units, a plurality of movable handset units establishing radio links with said plurality of base units, and a control unit controlling connections between said handset units and a public communication network through said base units, wherein each of said handset units has means for periodically transmitting outside-zone signals including the ID number of said handset unit for a predetermined period of time to notify one of said base units, with which said handset unit is in audio communication, of said handset unit being outside the zone for communications when the levels of the radio wave signals received from said one of said base units are less than a predetermined value during a predetermined period of time, each of said base units has means for outputting said outside-zone signals received from said handset unit communicating therewith to said control unit, and said control unit comprises:

means for notifying, on reception of said outside-zone signals, at least one of said base units except for said base unit communicating with said handset unit, of the number of the message channel between said handset unit and said base unit communicating therewith and the ID number of said handset unit, and means for instructing one of said base units that was notified by said notifying means and that transmitted the information indicating signal existence, to start the communications with said handset unit.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF THE EXEMPLARY EMBODIMENTS

Figure 1:
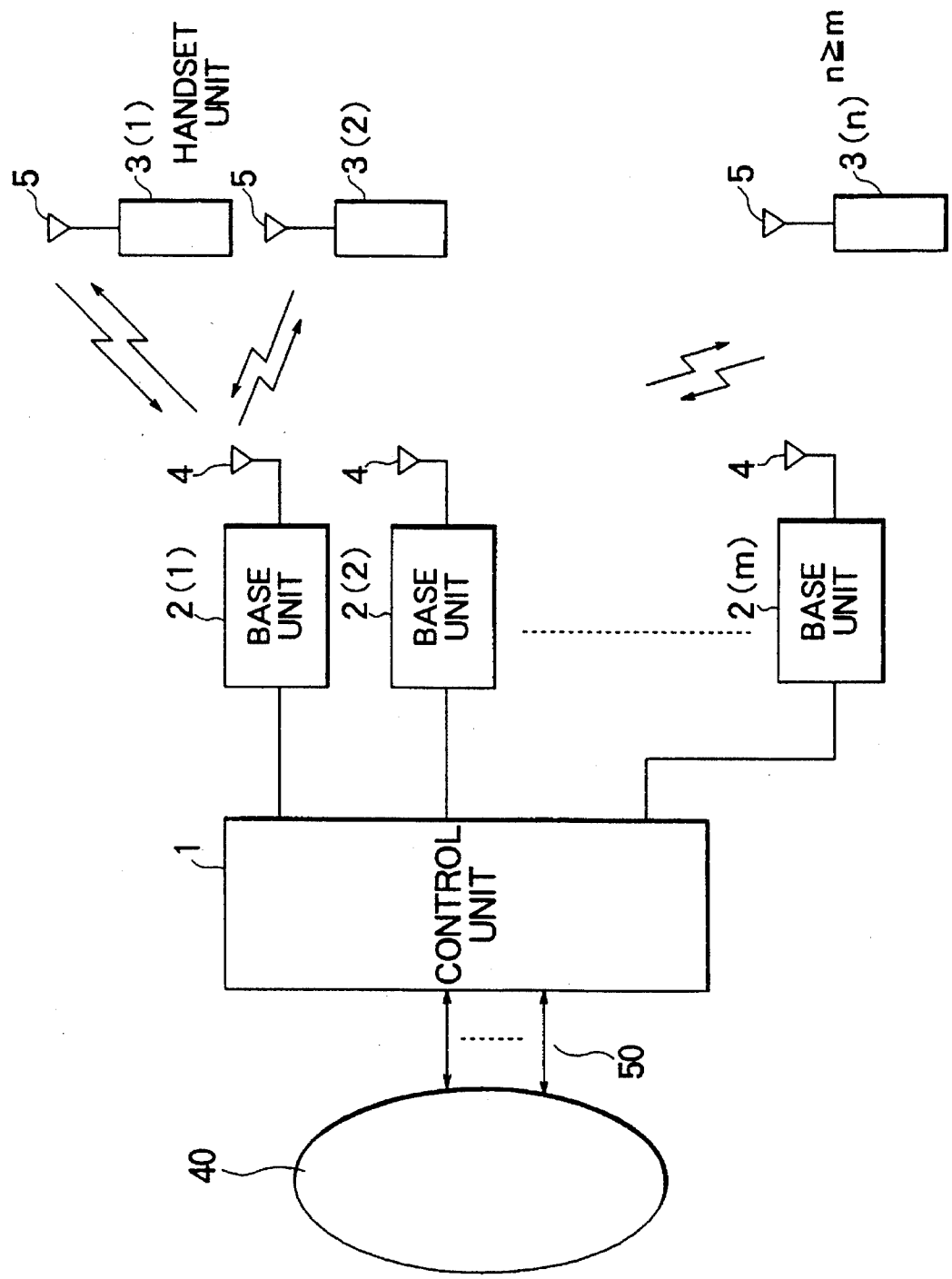
FIG. 1 is a block diagram of one embodiment of a cordless system telephone apparatus in accordance with the present invention.

Referring now to the drawings, and more particularly to FIG. 1 there is shown a block diagram of a cordless system telephone apparatus in accordance with the present invention.

In FIG. 1, the cordless system telephone apparatus comprises a control unit 1 connected to a public communication network 40 through telephone lines 50, base units 2(1) through 2(m) connected to the control unit 1 and equipped with antennas 4 respectively, and handset units 3(1) through 3(n) ($n \geq m$) having antennas 5 respectively. The whole radio communication area covered by all of the base units connected to the control unit 1 is divided into a plurality of zones. In each of the zones, at least one base unit is provided to take charge of radio communications with the handset units existing in the zone. The handset units, which can move around through the zones, find out open message channels from those assigned thereto to begin communications with the base units and then permit audio communications through the control unit connected to the base units and the public communication network 40. Therefore, the control unit 1, receiving calls from the handset units, controls the connections with the telephone lines 50 and also the switching procedures, as will be described hereinafter, for the base units that should establish audio links with the handset units during audio communications.

When the conditions for receiving radio waves have deteriorated due to the locational changes of one of the handset units establishing audio link with one of the base units, the cordless system telephone apparatus, thus configured, switches the base units for better communication qualities as follows.

Figure 2:
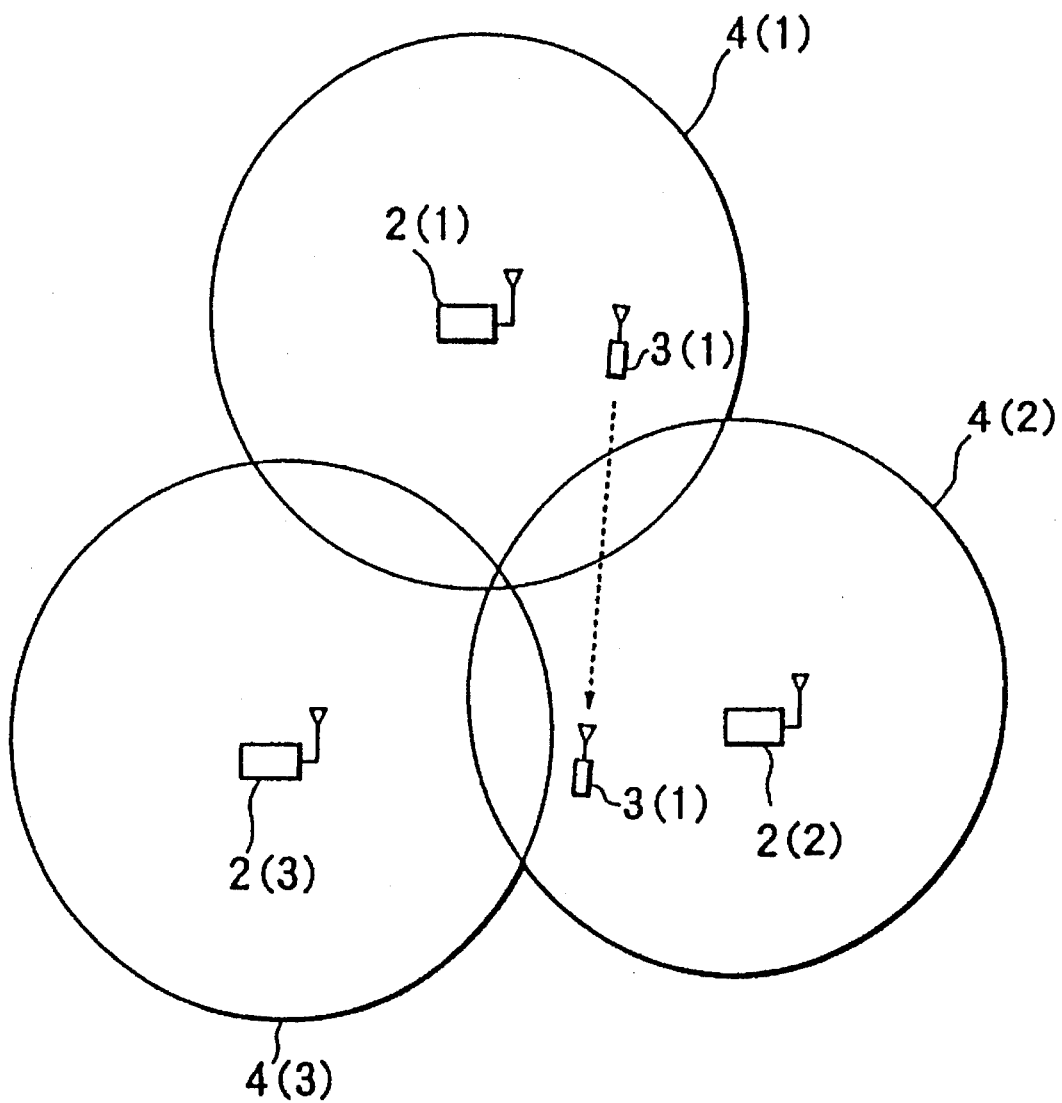
FIG. 2 shows the arrangement of base units and handset units in three zones.
Figure 3:
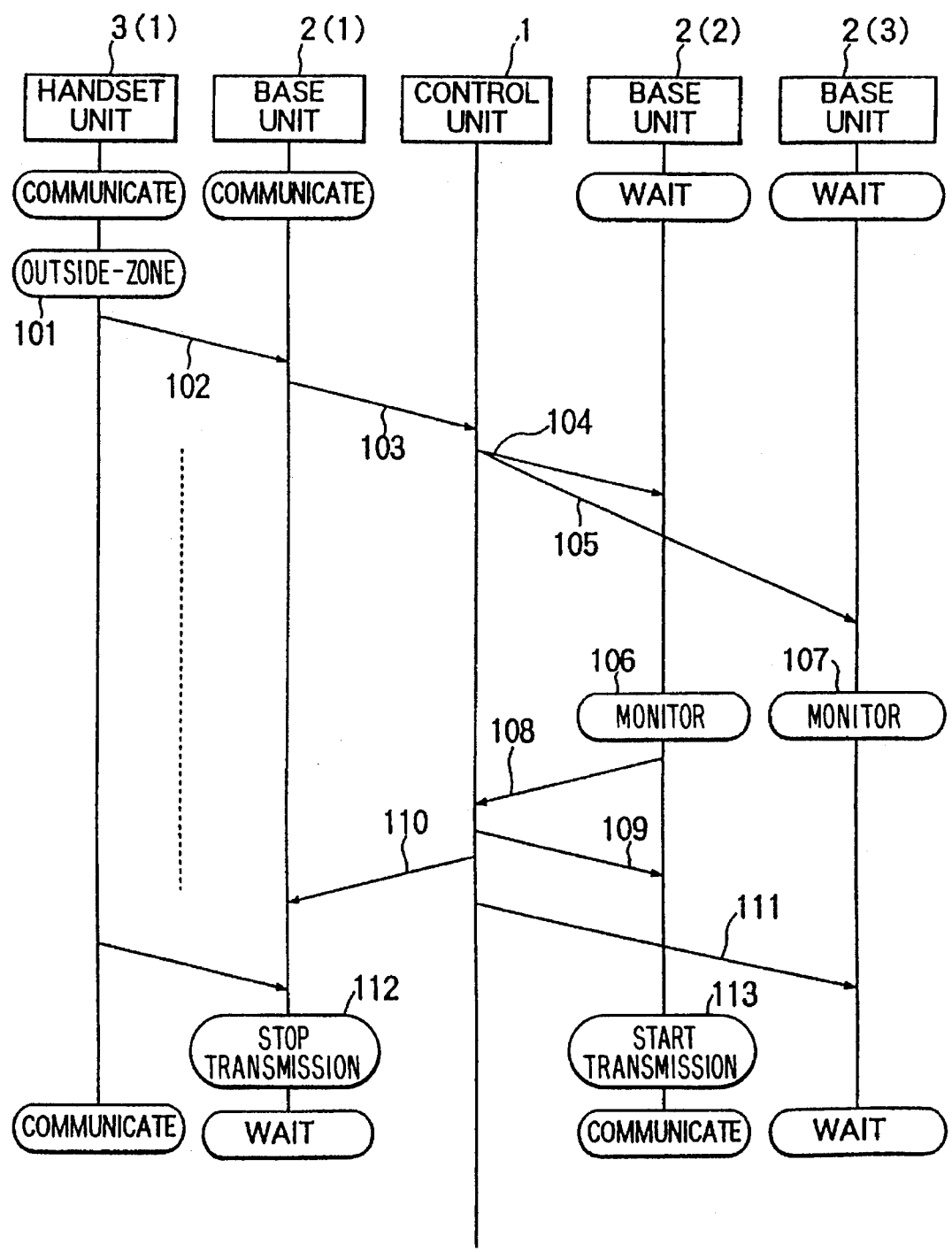
FIG. 3 is a flow chart representing the operation of the embodiment in accordance with the invention.

FIG. 2 shows an arrangement of the base units and handset units in three zones, and FIG. 3 provides a flow chart of the base unit changing operations for handset unit movements bringing about radio communication deteriorations.

It is assumed in the following descriptions that the base units 2(1) through 2(m) are respectively in charge of the respective zones 4(1) through 4(n) as shown in FIG. 2 and in the beginning the handset unit 3(1) and the base unit 2(1) in the zone 4(1) are communicating with each other.

When the handset unit 3(1), in audio communication with the base unit 2(1), moves to the zone 4(2), the levels of signals received from the base unit 2(1) through a downward message channel decreases to the levels under a predetermined value, causing the handset unit 3(1) to monitor whether the signal levels maintain less than the predetermined value for a predetermined time period or not. If the handset unit 3(1) detects the signal levels less than the value during the period (step 101; OUTSIDE-ZONE), the handset unit 3(1) transmits outside-zone signals including its ID (Identification) number at intervals of a predetermined time to the base unit 2(1) through an upward message channel (step 102; OUTSIDE-ZONE SIGNAL).

The base unit 2(1) relays the outside-zone signals from the handset unit 3(1) to the control unit 1 (step 103; NOTIFICATION OF BEING OUTSIDE-ZONE). Receiving those signals, the control unit 1 sends out the information including the ID number for the handset unit 3(1), the number of the message channel through which the base unit 2(1) and handset unit 3(1) are currently communicating, and others to the base units (the base units 2(2) and 2(3) in this example) in the vicinity of the base unit 2(1) simultaneously (steps 104 and 105: INSTRUCTION FOR MONITORING). Then the base units 2(2) and 2(3) search the upward message channels and find out the one occupied by the handset unit (the handset unit 3(1) in this case) transmitting the outside-zone signals, which include the ID number corresponding to that received from the control unit 1, in order to receive the signals through the found out channel. When the outside-zone signals including the corresponding ID number can be received through the upward channel, the base units 2(2) and 2(3) monitor the signal reception conditions of the channel for a predetermined period of time (steps 106 and 107; MONITOR). If the levels of radio wave signals received by the base units 2(2) and 2(3) through the upward channel for the handset unit 3(1) are or have become greater than a predetermined value, the base units are to notify the control unit 1 of "signal existence". In the following exemplary operations, it is assumed that only the base unit 2(2) conducts the notification for the control unit 1 (step 108; NOTIFICATION OF SIGNAL EXISTENCE).

The control unit 1 instructs the base unit 2(2) that reported the signal existence in step 108 to start communications with the handset unit 3(1) (step 109; INSTRUCTION FOR TRANSMISSION). Accepting this instruction, the base unit 2(2) begins to exchange signals with the handset unit 3(1) (step 113: START TRANSMISSION). If both of the base units 2(2) and 2(3) sent the signal existence notifications to the control unit 1 in step 108, the control unit 1 can instruct one of the base units that sent the notification earlier than the other to begin communications with the handset unit. The control unit 1, on the other hand, instructs the base unit 2(1) which has been communicating with the handset unit 3(1) to stop the communications and enter a waiting state (step 110; INSTRUCTION FOR WAITING), and thereby the base unit 2(1) ceases to communicate with the handset unit 3(1) (step 112: STOP TRANSMISSION). Also, the control unit 1 cancels the message channel that has been set for the handset unit 3(1) through the base unit 2(1) and sets a new channel for the handset unit through the base unit 2(2). The control unit 1 then instructs the base unit 2(3), which is in the monitoring state of step 107, to leave the state and return to a waiting condition (step 111; INSTRUCTION FOR WAITING).

In another embodiment of the invention, if the base unit 2(3) did not detect that the levels of the signals from the handset unit 3(1) exceed the predetermined value during the monitoring period or notified the control unit 1 of the signal existence after the base unit 2(2) had performed the notification for the control unit 1 (step 108), the base unit 2(3), receiving no instructions for starting communications from the control unit 1, can cancel its monitoring condition by itself after a predetermined interval instead of accepting the instructions in step 111.

In still another embodiment of the invention, the base unit 2(1) can shut down the communications with the handset unit 3(1) by itself when it has received the periodical outside-zone signals from the handset unit for a predetermined period of time. In this embodiment, the control unit 1 need not instruct the base unit 2(1) that has been in communication with the handset unit 3(1) to enter the waiting state.

In those embodiments described hereinbefore, the handset units monitor the levels of the signals received through the downward channels. However, it is also possible to arrange the base units to observe the levels of the signals sent through the upward message channels.

An embodiment of this type telephone apparatus in accordance with the invention will be described hereinafter. The base unit 2(1) in audio communication with the handset unit 3(1) checks the levels of the signals received through the upward channel, and when the signal levels have become less than the predetermined value, the base unit 2(1) transmits outside-zone signals to the handset unit 3(1) at intervals of a predetermined time through the downward message channel. Receiving these outside-zone signals from the base unit 2(1), the handset unit 3(1) sends out the outside-zone signals equivalent to those in step 102. The following operations are the same as those for the embodiment described hereinbefore. Namely, the procedures succeeding to step 102 are performed by the control unit 1 and the base units 2(2) and 2(3), allowing the communications between the new base unit 2(2) and the handset unit 3(1).

In this way, the identifications of the zones where the handset units exist are carried out only during the audio communications. In other words, such procedures or registrations are not performed while there are no audio communications between the units.

It should be noted that while in the above-described embodiments the control information such as the outside-zone signals is sent through the upward and downward message channels, the present invention is also applicable to those cordless system telephone apparatus that employ two different types of channels, namely message channels and control channels. In this case, the base units 2(2) and 2(3) may observe the levels of the signals received through the upward message channels and check the coincidences between those ID numbers that are included in the signals sent from the handset units through the control channels and those received from the control unit.

In view of the foregoing, it is seen that the invention provides a cordless system telephone apparatus, comprising base units and handset units exchanging radio wave signals, wherein the handset units do not communicate with the base units at all during waiting states for the identifications or re-registrations of handset unit existing zones, but only during audio communications the handset units or base units monitor the received signal levels to detect continuations of deteriorated reception conditions for a predetermined period of time, the control unit thereby switching the base units for better communication qualities. Consequently, the cordless system telephone apparatus according to the invention permits to suppress the power consumption of handset unit batteries in the periods without audio communications, resulting in extended battery lives. Also, owing to inhibited communications for the zone identifications in the no audio communication periods, unnecessary radio wave occupations are prevented in the telephone apparatus according to the invention, realizing efficient radio wave utilizations.

While the invention has been described in terms of certain preferred embodiments thereof, it will be obvious to those skilled in the art that various changes and modifications can be made without departing from the scope of the invention as defined by the appended claims.

The invention claimed is:

1. A cordless telephone system comprising a plurality of base units, a plurality of movable handset units establishing radio links with said plurality of base units, and a control unit controlling connections between said handset units and a public communication network through said base units, wherein:

each of said handset units includes a transmitting device which periodically transmits outside-zone signals including an ID number of said handset unit for a predetermined period of time to notify one of said base units to which said handset unit has established a radio link of said handset unit being outside of a zone for communications when the level of the radio wave signal received from said linked base unit is less than a predetermined value during a predetermined period of time, each of said base units includes an output device which outputs, to said control unit, said outside-zone signals received from respective ones of said handset units communicating therewith, and said control unit comprises:

a signaling device which notifies, on reception of said outside-zone signals, several ones of said base units excluding said linked base unit, of a number indicating a message channel between said handset unit and said linked base unit and the ID number of said handset unit, and an instructing device which:

instructs the several ones of said base units to concurrently determine respective signal levels for communicating with said handset unit via said message channel, wherein the multiple ones of said base units report the respective determined signal levels to said control unit, as the signal levels are determined, instructs one of said multiple ones of said base units to start communicating with said handset unit, and instructs said linked base unit that had been in communication with said handset unit to stop the communications and enter a waiting state;

wherein:

said several base units that have been notified by said control unit of said message channel number and said ID number concurrently monitor the conditions of the signals received from said handset unit and notify said control unit if the respective levels of said received signals are greater than a predetermined value, and said control unit instructs one of said several base units that has notified said control unit before any other one of said several base units, to communicate with said handset unit.

2. A cordless telephone system as recited in claim 1, wherein said linked base unit that had been in communication with said handset unit includes a stopping device which stops the communications by itself and enters a waiting state when it has received said outside-zone signals from said handset unit for a predetermined period of time.

3. A cordless telephone system as recited in claim 1, wherein said instructing device further instructs each of said several base units, excluding said base unit that has been instructed to communicate with said handset unit, to enter a waiting state.

4. A cordless telephone system as recited in claim 1, wherein said several base units, excluding said base unit that has been instructed to communicate with said hand set unit, cancel their monitoring operations to enter waiting states by themselves after a predetermined time has elapsed.

5. A cordless telephone system as recited in claim 1, wherein each of said plurality of base units comprises a transmitting device which transmits outside-zone signals, to said handset units, said outside-zone signals indicating that a respective one of said handset units with which said base unit is communicating is outside said communication zone, periodically for a predetermined period of time if a signal received from said respective handset unit communicating therewith has a level which is less than a predetermined value during a predetermined time period.

6. A method for controlling communications in a cordless telephone system comprising a plurality of base units, a plurality of movable handset units establishing radio links with said plurality of base units, and a control unit controlling connections between said handset units and a public communication network through said base units, said method comprising the steps of:

periodically transmitting, from each of said handset units, outside-zone signals including an ID number of said handset unit for a predetermined period of time to notify one of said base units to which said handset unit has established a radio link of said handset unit being outside of a zone for communications when the level of the radio wave signal received from said linked base unit is less than a predetermined value during a predetermined period of time, outputting, from each of said base units to said control unit, said outside-zone signals received from respective ones of said handset units communicating therewith, and performing, in said control unit, the steps of:

notifying, on reception of said outside-zone signals, several ones of said base units excluding said linked base unit, of a number indicating a message channel between said handset unit and said linked base unit and the ID number of said handset unit, instructing the several ones of said base units to concurrently determine respective signal levels for communicating with said handset unit via said message channel, wherein the multiple ones of said base units report the respective determined signal levels to said control unit, as the signal levels are determined, instructing one of said multiple ones of said base units to start communicating with said handset unit, and instructing said linked base unit that had been in communication with said handset unit to stop the communications and enter a waiting state;

wherein:

said several base units that have been notified by said control unit of said message channel number and said ID number concurrently monitor the conditions of the signals received from said handset unit and notify said control unit if the respective levels of said received signals are greater than a predetermined value, and said control unit instructs one of said several base units that has notified said control unit before any other one of said several base units, to communicate with said handset unit.

7. A method for controlling communications in a cordless telephone system as recited in claim 6, wherein said linked base unit that had been in communication with said handset unit performs the steps of stopping communications by itself and entering a waiting state when it has received said outside-zone signals from said handset unit for a predetermined period of time.

8. A method for controlling communications in a cordless telephone system as recited in claim 6, wherein said control unit further performs the step of instructing each of said several base units, excluding said base unit that has been instructed to communicate with said handset unit, to enter a waiting state.

9. A method for controlling communications in a cordless telephone system as recited in claim 6, wherein said several base units, excluding said base unit that has been instructed to communicate with said hand set unit, perform the steps of canceling their monitoring operations and entering a waiting state by themselves after a predetermined time has elapsed.

10. A method for controlling communications in a cordless telephone system as recited in claim 6, wherein each of said plurality of base units performs the step of transmitting outside-zone signals, to said handset units, said outside-zone signals indicating that a respective one of said handset units with which said base unit is communicating is outside said communication zone, periodically for a predetermined period of time if a signal received from said respective handset unit communicating therewith has a level which is less than a predetermined value during a predetermined time period.

* * * * *

UNITED STATES PATENT AND TRADEMARK OFFICE
CERTIFICATE OF CORRECTION

PATENT NO. : 5,493,605
DATED : February 20, 1996
INVENTOR(S) : Hitoshi Hachiga

It is certified that error appears in the above-indentified patent and that said Letters Patent is hereby corrected as shown below:

Title page, item [54], and col. 1, after "SYSTEM" insert HAVING--.

item [75], inventors: should read--Hitoshi Hachiga, Chiba, Japan--.

Signed and Sealed this

Second Day of July, 1996

Attest:

BRUCE LEHMAN

*Attesting Officer*    *Commissioner of Patents and Trademarks*